C. UEBELMESSER.
AUTOMATIC LOOP MAKING AND RETAINING DEVICE.
APPLICATION FILED MAR. 17, 1915.

1,309,990.

Patented July 15, 1919.
2 SHEETS—SHEET 1.

WITNESSES:

INVENTOR
Charles Uebelmesser.

C. UEBELMESSER.
AUTOMATIC LOOP MAKING AND RETAINING DEVICE.
APPLICATION FILED MAR. 17, 1915.
1,309,990.
Patented July 15, 1919.
2 SHEETS—SHEET 2.
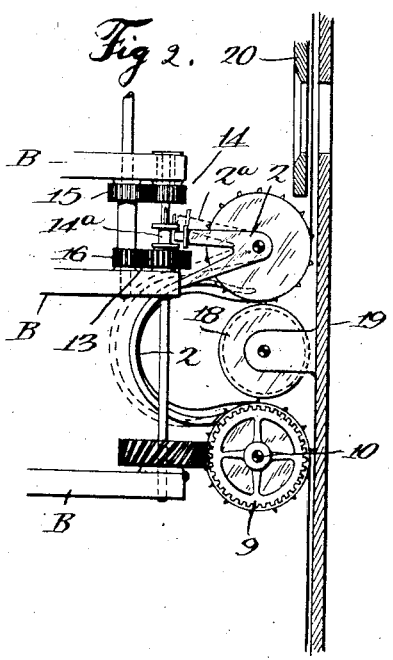
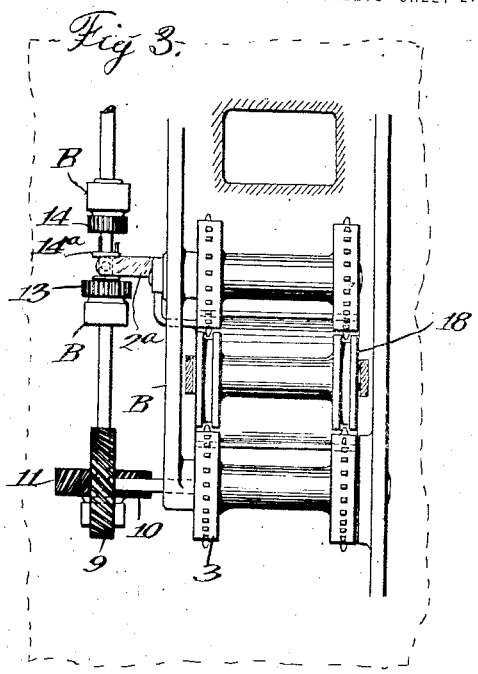
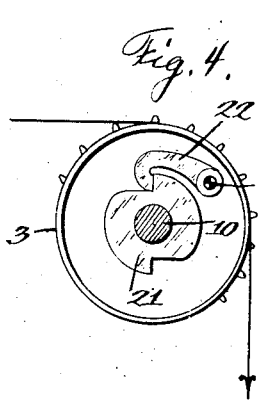
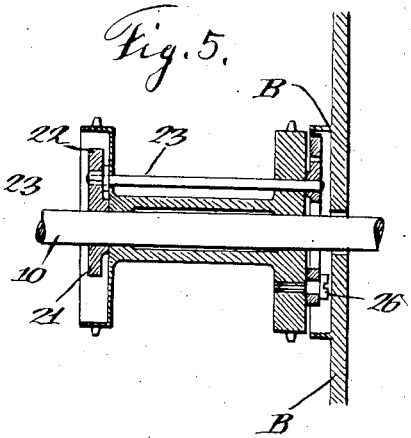
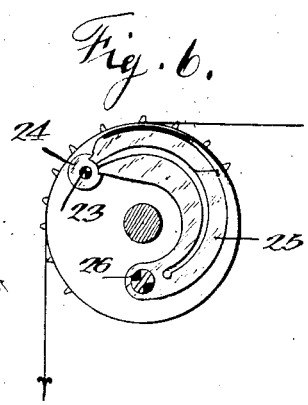
WITNESSES:
INVENTOR
Charles Uebelmesser
BY
ATTORNEY

UNITED STATES PATENT OFFICE.

CHARLES UEBELMESSER, OF NEW YORK, N. Y., ASSIGNOR TO CRU PATENTS CORPORATION, A CORPORATION OF NEW YORK.

AUTOMATIC LOOP MAKING AND RETAINING DEVICE.

1,309,990.

Specification of Letters Patent.　　Patented July 15, 1919.

Application filed March 17, 1915.　Serial No. 15,068.

*To all whom it may concern:*

Be it known that I, CHARLES UEBELMESSER, a subject of the Emperor of Germany, residing at New York city, county of New York, State of New York, have invented certain new and useful Improvements in Automatic Loop Making and Retaining Devices, of which the following is a full, clear, and exact description.

The object of my invention is to provide a device that will make an original loop of film in a motion picture machine, and that also will maintain the desired size of said loop, and particularly a device that will both enlarge or decrease the size of a loop automatically, especially between an intermittent feed and a lower continuously driven take-up sprocket in a motion picture apparatus by means of a variable speed.

The scope of my invention will be pointed out in the claims.

In the accompanying drawings, which form part of my specification,

Fig. 2 is a side view of my device in particular.

Fig. 3 is a perspective view of the intermittent sprocket and lower feed sprocket in the motion picture machine seen from the back of the aperture.

Fig. 4 is a left side view of the lower feed sprocket.

Fig. 5 is a vertical cut through the lower sprocket and part of the frame of the motion picture machine.

Fig. 6 is a right side view of the lower feed sprocket.

Figure 1:
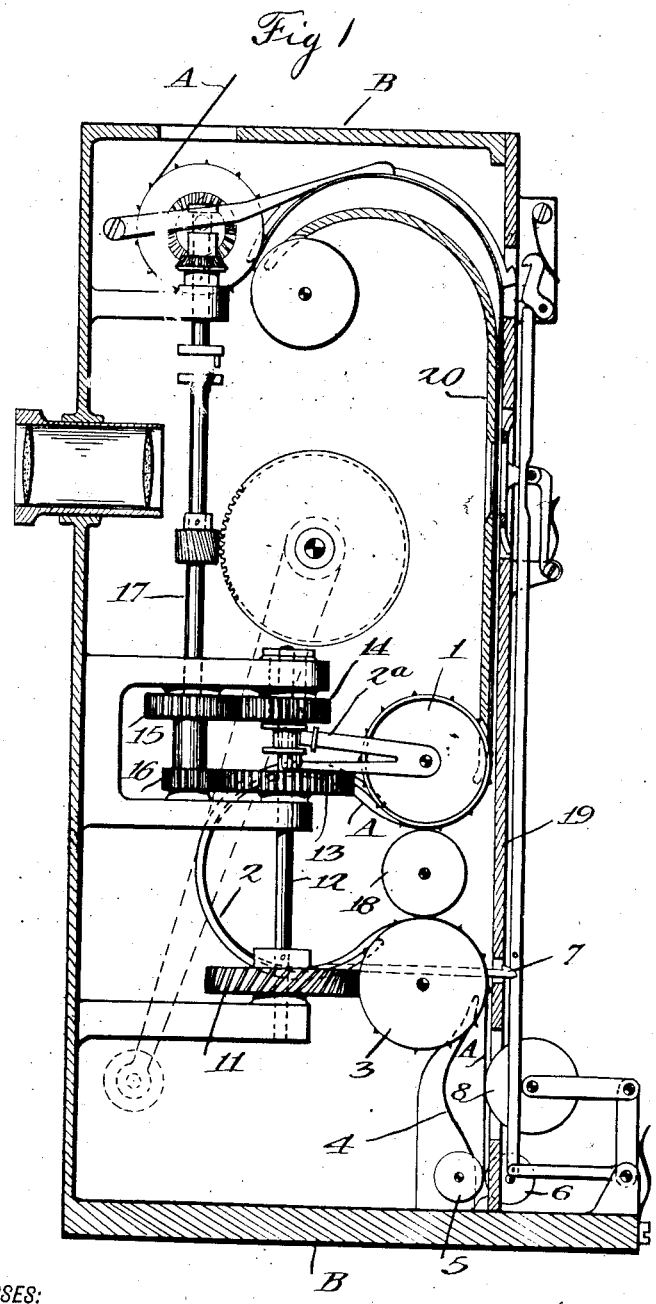
Figure 1 is a side elevation of a motion picture machine embodying my device.

In a motion picture machine the film is usually received by the upper feed sprocket, especially in the motion picture machine of the intermittent type, a loop is then formed between this sprocket and the aperture plate, thereafter the film is manipulated by an intermittently moving sprocket, a loop is again formed between the intermittent sprocket and a lower continuously driven feed sprocket, and from there on to a take-up reel, which is frictionally driven. My device will make a loop as soon as the film A is received by the intermittent sprocket 1, which sprocket will push the film around the inside surface of a movable guide cage 2 to feed sprocket 3, and from there push it along guide 4 and finally the film passes between rollers 5 and 6 into the usual receptacle. Thus, the loop is formed automatically merely by putting sprockets 1 and 3 in motion. The movable guide 2 is locked in position during this initial loop making operation more specifically described in my application Serial #15,070, filed March 17th, 1915. This locking device 7, however, is released as soon as the loop is made and the film has passed the rollers 5 and 6 and 8. Should, however, the loop become too large in said guide 2 then the lower feed sprocket 3 should be driven faster than normally for a short period and this is accomplished as follows, as seen in Figs. 1 and 2 of my drawing:

Gear 9, on shaft 10, is driven by gear 11 on shaft 12. This shaft has loosely mounted upon its upper portion gears 13 and 14 of different size, and a slidable clutch member 14ª connected by a key-way with shaft 12. This clutch member is actuated by the lever 2ª of the movable guide 2. Gears 13 and 14 are driven by gears 15 and 16 on shaft 17 and are driven by the regular driving mechanism of the motion picture machine. When the film is in operation, and for any reason the loop should have become too large, the film loop will then exert a slight pressure against the inside of the pivotally connected guide 2 which will then move in the direction shown by the dotted lines in Fig. 2. The lever 2ª will now disconnect the slower gear drive 13 and connect the faster driven gear 14, and as soon as the loop has become smaller the guide 2 will fall back and lever 2ª will again connect the regular drive 13 and 16. Thus the size of the loop has been reduced automatically during the operation of the motion picture machine.

Now should the loop in the film become too small for any reason whatsoever during the rest period of the intermittently driven sprocket 1, the film will press slightly against roller 18. This roller is fixedly mounted in film guide door 19. Since this sprocket is loosely mounted on shaft 10, this sprocket will stop (see Figs. 4, 5 and 6), but the shaft 10 with clutch collar 21 keeps on moving in its regular direction. In sprocket 3 is mounted a pawl 22 fastened on shaft 23. On the other end of shaft 23 is fastened a grooved collar 24, which operates an elastic brake shoe 25 fastened to sprocket 3 by screw 26. When the sprocket 3 is stopped, pawl 22 is moved up by the collar 21 which rotates continuously with shaft 10 and will turn shaft 23 and collar 24 and open the brake 25 against the internal surface of the frame B (see Fig. 5) until pawl 22 falls again into a notch on collar 21. In the meantime the loop in the film has become of normal size automatically, since the intermittent sprocket continues on its regular function. The driving mechanism of the intermittent feed is not shown in my drawings, as same may be of any usual type.

What I claim as my invention is:

1. In a motion picture machine, the combination with an intermittently and a continuously rotated sprocket, a film guide, located between said sprockets and adapted to be moved by an increase in the size of a loop in the film and means actuated by the movement of said guide for controlling the operation of said continuously rotating sprocket.

2. In a motion picture machine, the combination with intermittent and continuous sprockets, of means interposed between said sprockets and controlled by an increase in the size of the loop formed in the film between said sprockets for controlling the operation of said continuously rotating sprocket.

3. In a motion picture machine, the combination with continuous and intermittent sprockets, of a pivotally mounted guide located between said sprockets to form a loop in the film and means for controlling the speed of rotation of said continuous sprocket by an increase of the size of the loop formed by said guide.

4. In a motion picture machine, the combination with an intermittently actuated sprocket and a continuously rotated sprocket, and means controlled by an increase of the normal amount of film between said sprockets for controlling the speed of said continuously rotating sprocket.

5. In a motion picture machine, the combination with intermittent and continuous sprockets, a movable guide located between said sprockets to form a loop for the film and means actuated by pressure of the film on said guide caused by an increase of the size of said loop for moving the same and means actuated thereby for changing the speed of rotation of said continuous sprocket.

6. In a motion picture machine the combination with an intermittent and continuous sprockets, a pivotally mounted film guide interposed between said sprockets to form a loop for the film, a lever for said guide, and adapted to be operated by the movement thereof, a shiftable gear mechanism, for controlling the operation of said continuous sprocket and means actuated by the movement of said lever for shifting said gears to vary the speed of rotation of said sprocket.

Signed at New York city, N. Y., this 15th day of March, one thousand nine hundred and fifteen.

CHARLES UEBELMESSER.

Witnesses:
ROBERT RICHTER,
F. F. WEISS.